(12) United States Patent
Osada et al.

(10) Patent No.: US 8,271,292 B2
(45) Date of Patent: Sep. 18, 2012

(54) SIGNAL BANDWIDTH EXPANDING APPARATUS

(75) Inventors: Masataka Osada, Kawasaki (JP); Takashi Sudo, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 530 days.

(21) Appl. No.: 12/573,242

(22) Filed: Oct. 5, 2009

(65) Prior Publication Data

US 2010/0217606 A1 Aug. 26, 2010

(30) Foreign Application Priority Data

Feb. 26, 2009 (JP) ................. P2009-044521

(51) Int. Cl.
*G10L 19/00* (2006.01)
(52) U.S. Cl. ........................................... 704/500
(58) Field of Classification Search .................. 704/500
See application file for complete search history.

(56) References Cited

U.S. PATENT DOCUMENTS

| 2008/0243512 A1 | 10/2008 | Breebaart et al. |
| 2008/0281590 A1 | 11/2008 | Breebaart et al. |

FOREIGN PATENT DOCUMENTS

| JP | 8-289389 A | 11/1996 |
| JP | 2000-078018 A | 3/2000 |
| JP | 2001-249692 A | 9/2001 |
| JP | 2002-290628 A | 10/2002 |
| JP | 2006-259349 A | 9/2006 |
| JP | 2006-323182 A | 11/2006 |
| JP | 2007-534995 A | 11/2007 |
| JP | 2008-033211 A | 2/2008 |
| WO | 2007/046048 A1 | 4/2007 |

OTHER PUBLICATIONS

Japanese Office Action dated Aug. 2, 2011 (and English translation thereof), issued in counterpart Japanese Application No. 2009-044521.

*Primary Examiner* — Jakieda Jackson
(74) *Attorney, Agent, or Firm* — Holtz, Holtz, Goodman & Chick, PC

(57) ABSTRACT

A signal bandwidth expanding apparatus configured to expand a bandwidth of an input signal. The apparatus includes: a time acquiring section configured to acquire time information; a priority holding section configured to hold priority information of processes, each process divided from a process of bandwidth expansion; a controller configured to: sequentially perform the processes from a process having a higher priority using the priority information held by the priority holding section, calculate a time taken for the process using the time acquiring section when the process is ended, and control whether or not a next process having a secondary priority is performed according to the time taken for the process; and a frequency balance correcting section configured to change a frequency characteristic of a signal expanded in a bandwidth according to the process performed by the controller.

4 Claims, 13 Drawing Sheets

SIGNAL BANDWIDTH EXPANDING APPARATUS

CROSS-REFERENCE TO RELATED APPLICATIONS

The entire disclosure of Japanese Patent Application No. 2009-044521 filed on Feb. 26, 2009, including specification, claims, drawings and abstract is incorporated herein by reference in its entirety.

BACKGROUND

1. Field of the Invention

One aspect of the present invention relates to a signal bandwidth expanding apparatus which converts a signal, such as voice, music, or audio with limited bandwidth, into a wideband signal.

2. Description of the Related Art

When the bandwidth of the signal (input signal) such as voice, music, or an audio is expanded to a wideband signal, in order for the sound to be heard not artificially but naturally, there is a need to properly change a signal processing method of expanding a bandwidth according to a signal (target signal) of which the bandwidth is intended to be expanded and is included in the input signals. As a bandwidth expansion processing method according to the target signal, there a scheme in which the frequency band is expanded after performing a linear prediction analysis on the voice when the target signal is the voice, a scheme in which the frequency band is expanded after performing a frequency domain conversion on the music or the audio when the target signal is the music or the audio, and a scheme in which the frequency band to be expanded is switched based on whether or not the voice is a voiced sound or an unvoiced sound even when the target signal is the voice. In addition, when the above-mentioned bandwidth expanding processes are performed, heavy computational load is needed. However, there is a method of changing the bandwidth expanding method according to a state of a system load (see JP-A-2006-259349, for instance).

In the related signal bandwidth expanding apparatus, the expanding method is changed according to the state of the system load, so that it is possible to prevent the overload of the amount of throughput. However, the frequency balance between the expanded bandwidth and the existing bandwidth is not considered. For this reason, when a part of the bandwidth is expanded, the entire balance of the frequency is broken, so that bandwidth sensitivity of the existing bandwidth is relatively reduced and the high voice quality cannot be felt.

SUMMARY

According to an aspect of the invention, there is provided a signal bandwidth expanding apparatus configured to expand a bandwidth of an input signal, the apparatus including: a time acquiring section configured to acquire time information; a priority holding section configured to hold priority information of processes, each process divided from a process of bandwidth expansion; a controller configured to: sequentially perform the processes from a process having a higher priority using the priority information held by the priority holding section, calculate a time taken for the process using the time acquiring section when the process is ended, and control whether or not a next process having a secondary priority is performed according to the time taken for the process; and a frequency balance correcting section configured to change a frequency characteristic of a signal expanded in a bandwidth according to the process performed by the controller.

BRIEF DESCRIPTION OF THE DRAWINGS

Embodiment may be described in detail with reference to the accompanying drawings, in which.

DETAILED DESCRIPTION OF THE EMBODIMENTS

In the following, exemplary embodiments of the invention will be described with reference to the accompanying drawings.

Figure 1A:
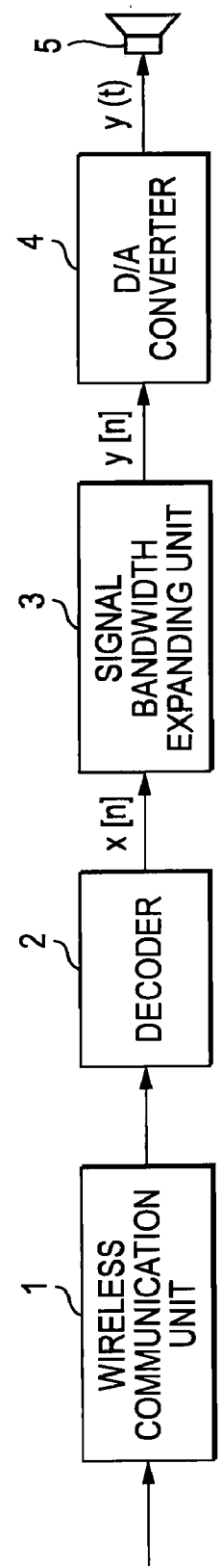
FIGS. 1A and 1B are exemplary circuit block diagrams illustrating a configuration of a communication apparatus and a digital audio player according to an embodiment of the invention.

FIG. 1A shows a configuration of a communication apparatus according to a first embodiment of the invention. The communication apparatus shown in this drawing shows a reception system of a wireless communication apparatus such as a mobile telephone, which is provided with a wireless communication unit 1, a decoder 2, a bandwidth expanding unit 3, a digital/analog (D/A) converter 4, and a speaker 5.

The wireless communication unit 1 performs wireless communication with a wireless base station which is accommodated to a mobile communication network, which communicates with a counterpart communication apparatus by establishing a communication link therewith via the wireless base station and the mobile communication network. The decoder 2 decodes input data that the wireless communication unit 1 receives from the counterpart communication apparatus in a predetermined processing unit (1 frame=N samples), and obtains digital input signals x[n] (n=0, 1, ..., N−1). Then, the decoder 2 outputs the digital input signals x[n] to the bandwidth expanding unit 3 in every frame. Further, the sampling number N of one frame of the input signals x[n] is 160 samples, for example. In addition, the sampling frequency of the input signals x[n] is assumed to fs [Hz]. In this case, the input signals x[n] are signals with limited bandwidth ranging from fs_nb_low [Hz] to fs_nb_high [Hz].

The bandwidth expanding unit 3 performs a bandwidth expanding process on the input signals x[n] (n=0, 1, ..., N−1) in frame units, and outputs the resulting signals as output signals y[n] which is expanded in a bandwidth ranging from fs_nb_low [Hz] to fs_wb_high [Hz]. At this time, the sampling frequency of the output signals y[n] may be the sampling frequency fs [Hz] of the decoder 2 or be changed to a higher sampling frequency of fs' [Hz]. Here, it is assumed that the expanded output signal y[n] at the sampling frequency fs' [Hz] is obtained in frame units by the bandwidth expanding unit 3. Further, the bandwidth expanding unit 3 will be described in detail later. In this case, fs_wb_low≦fs_nb_low<fs_nb_high<fs/2≦fs_wb_high<fs'/2 is satisfied. Further, in the following descriptions, in order to exemplify the low frequency band expansion and the high frequency band expansion, fs_wb_low<fs_nb_low and fs_nb_high<fs_wb_high are assumed. As these parameters, for example, there are fs=8000 [Hz], fs'=16000 [Hz], fs_nb_low=340 [Hz], fs_nb_high=3950 [Hz], fs_wb_low=50 [Hz], and fs_wb_high=7950 [Hz], but these parameters are not limited thereto.

The D/A converter 4 converts the wideband output signal y[n] into an analog signal y(t), and outputs the analog signal y(t) to the speaker 5. The speaker 5 outputs the output signal y(t) which is the analog signal to an acoustic space.

Figure 1B:
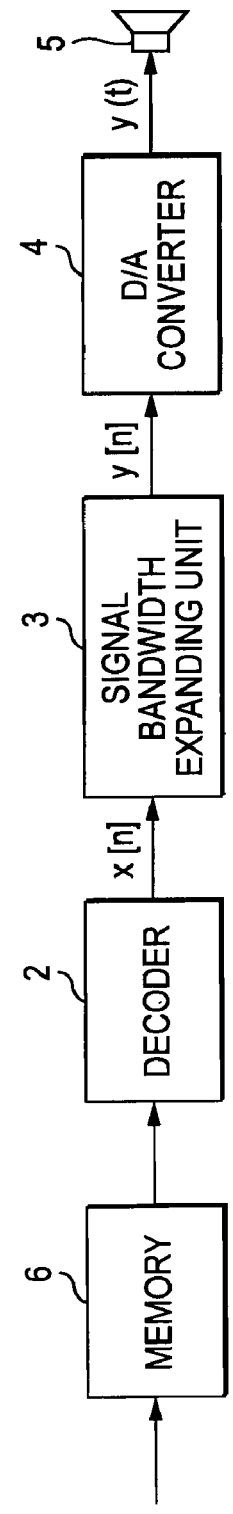

Further, in FIG. 1A, the invention is applied to the communication apparatus as an example. As shown in FIG. 1B, the invention may be applied to a digital audio player. The digital audio player is provided with a memory 6 using a flash memory or a hard disk drive (HDD) instead of the wireless communication unit 1. The decoder 2 decodes the audio data read out from the memory 6 as described above.

Figure 2:
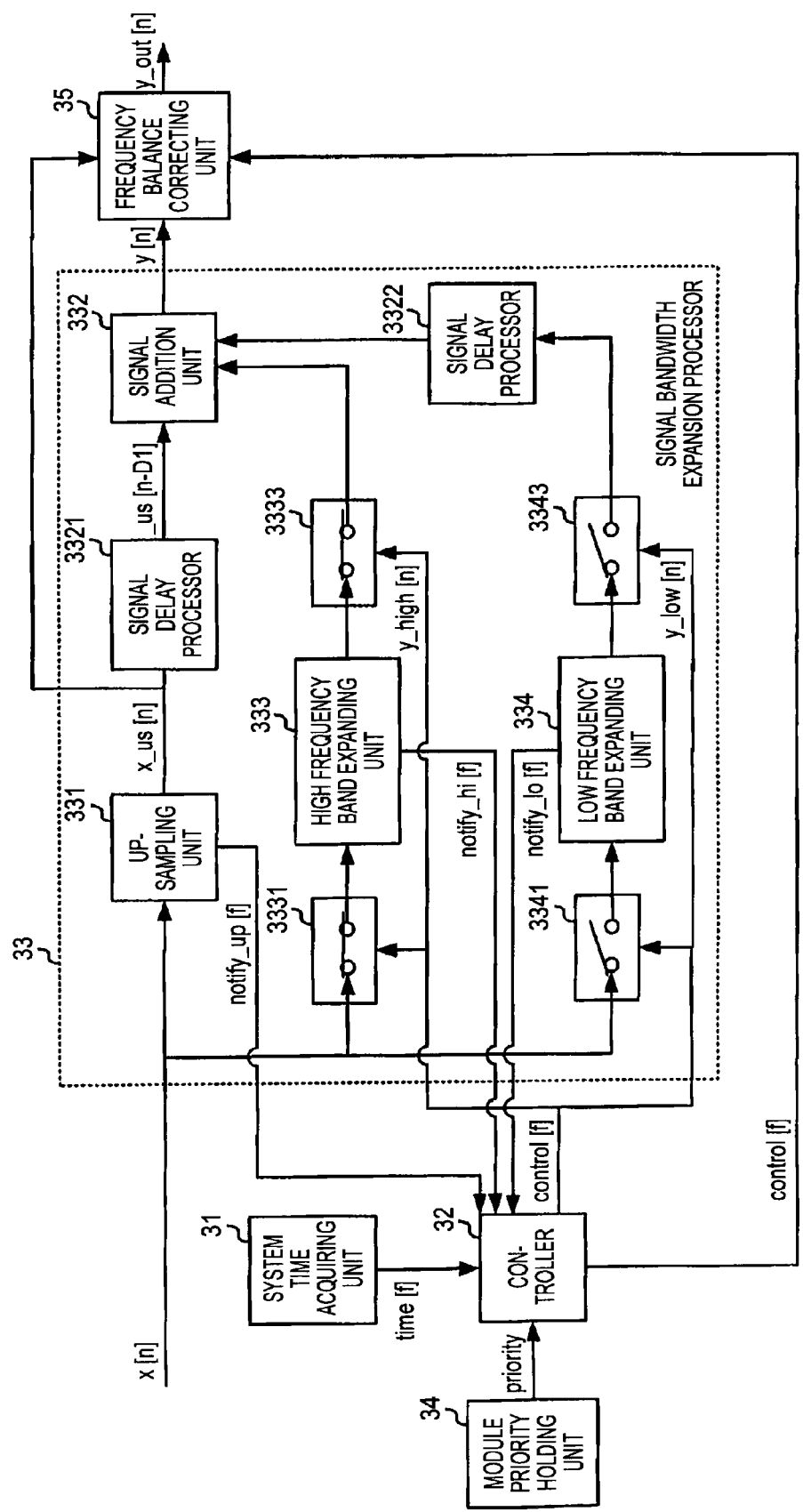
FIG. 2 is an exemplary block diagram illustrating a configuration of a signal bandwidth expanding unit of a communication apparatus according to an embodiment of the invention.

Next, the bandwidth expanding unit 3 will be described. FIG. 2 shows a configuration of the bandwidth expanding unit 3 according to the embodiment. As shown in FIG. 2, the bandwidth expanding unit 3 is provided with a system time acquiring unit 31, a controller 32, a signal bandwidth expansion processor 33, a module priority holding unit 34, and a frequency balance correcting unit 35. The signal bandwidth expansion processor 33 is provided with an up-sampling unit 331, a signal addition unit 332, a high frequency band expanding unit 333, a low frequency band expanding unit 334, signal delay processors 3321 and 3322, switches 3331, 3333, 3341, and 3343. These components may be implemented by one processor and software which is stored in a recording medium (not shown).

The system time acquiring unit 31 acquires time information in the system. As the time information, there is a counter value of a hardware timer supported by the LSI, a counter value of a system clock of the LSI, a counter value obtained by dividing the system clock, and the like, for example. In addition, the time information is not limited thereto, but any means can be substituted as long as a lapsed time on the system can be obtained.

The module priority holding unit 34 holds the sequence of modules (module priority) to be firstly processed among the respective modules configuring the signal bandwidth expansion processing module 33, and outputs the module priority to the controller 32. As a method of determining the priority of the module, it is conceivable a method based on the importance in hearing sense of the frequency band which is generated by each module, for example. In general, the lower the frequency is, the higher the resolution appears in the hearing sense of human ears. As an example of a scale with which the resolution of the hearing sense of human ears becomes constant, there is a bark scale. Here, the bark scale will be described as an example, and furthermore a scale obtained by simulating the hearing sense such as a mel scale may be employed.

The bark scale is known that it can be approximated as Bark=13*arctan(0.76*frequency (Hz)/1000)+3.5*arctan((frequency (Hz)/7500)^2). By using the bark scale, when the fs_nb_low=340 [Hz], fs_nb_high=3950 [Hz], fs_wb_low=50 [Hz], and fs_wb_high=7950 [Hz] are converted into the bark scale, these become fs_nb_low_bark=3.294487107, fs_nb_high_bark=17.18720761, fs_wb_low_bark=0.493917983, and fs_wb_high_bark=21.24045106, respectively. That is, a bark scale width bark_low of the low frequency band expanding portion (50 to 340 [Hz]) becomes 2.800569125 (=3.294487107−0.493917983), and a bark scale width bark_high of the high frequency band expanding portion (3950 to 7950 [Hz]) becomes 4.053243445 (=21.24045106−17.18720761). The bark scale width of the high frequency band expanding portion is larger than that of the low frequency band expanding portion. Therefore, in the module priority, the up-sampling which is the existing bandwidth portion and the essential module in the bandwidth expansion has the highest priority, the secondary priority is assigned to the high frequency band expanding process, and the lowest priority is assigned to the low frequency band expanding process.

As described above, the module priority holding unit 34 performs the priority assignment on the processes of the bandwidth expansion. On the basis of the priority, the controller 32, which will be described later, controls the signal bandwidth expansion processor 33, so that even when the system load is large, it is possible to perform the voice band process with high quality, which can firstly generate the important band in the hearing sense. Further, in the above description, the expansion process is exemplified in two ways; that is the low frequency band expansion and the high frequency band expansion. However, even when the expansion process is performed by finely dividing the band into 3 or more bands, the same method can be employed.

The controller 32 receives a system time time[f] which is output from the system time acquiring unit 31, a module priority which is output from the module priority holding unit 34, and execution end notifications notify_up[f], notify_hi[f] and notify_lo[f] which are respectively output from the up-sampling unit 331, the high frequency band expanding unit 333 and the low frequency band expanding unit 334. The controller 32 outputs a control signal control[f] to control the up-sampling unit 331, the high frequency band expanding unit 333 and the low frequency band expanding unit 334 so as to operate or not operate so that the operation of the signal bandwidth expansion processor 33 ends within a predetermined time.

Figure 3:
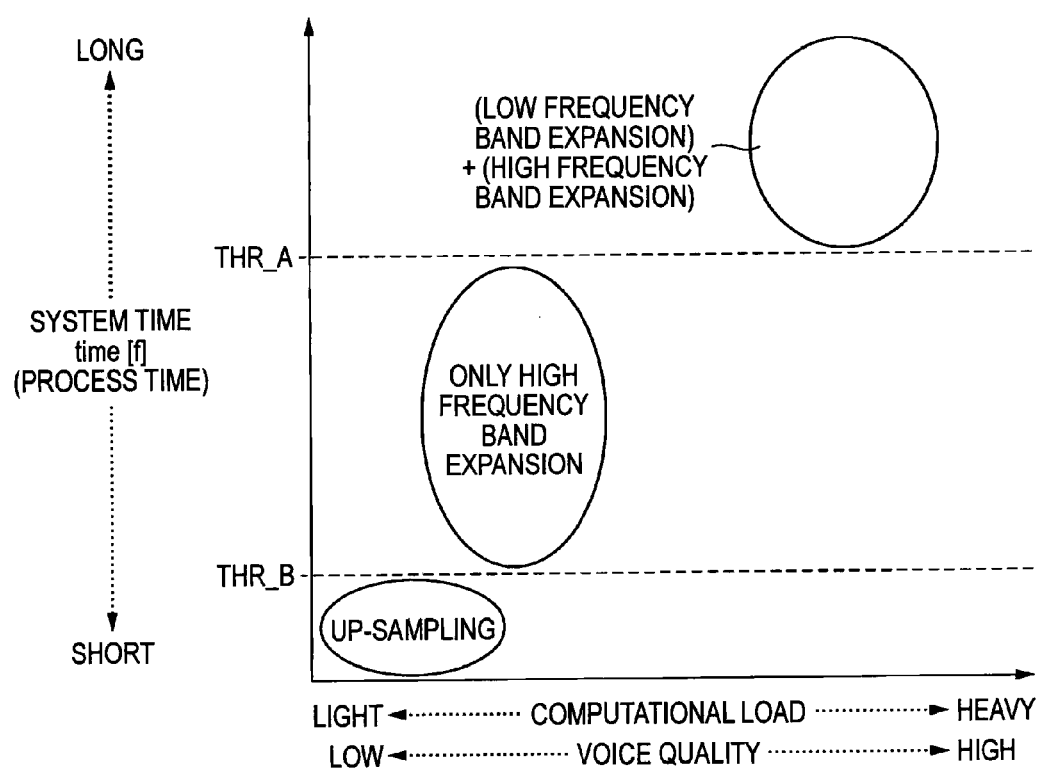
FIG. 3 is an exemplary view illustrating an operation control of a controller of a signal bandwidth expanding apparatus.

FIG. 3 shows a control operation of the controller 32. When it is supposed that the signal bandwidth expanding process is not ended in a predetermined time due to the influence of the system load or the influence of inner processes of the signal bandwidth expanding process, the controller 32 controls the bandwidth expansion processing method to be performed simply. When it is supposed that the signal bandwidth expanding process is ended within the predetermined time, the controller 32 controls the bandwidth expanding processing method to be performed with high accuracy.

As a result, since the signal bandwidth expanding process can be ended independently of the influence of the system load or the change in time taken for processing the signal bandwidth expansion, it is possible to prevent the degradation of voice quality in the hearing sense due to sound interruption.

Figure 4:
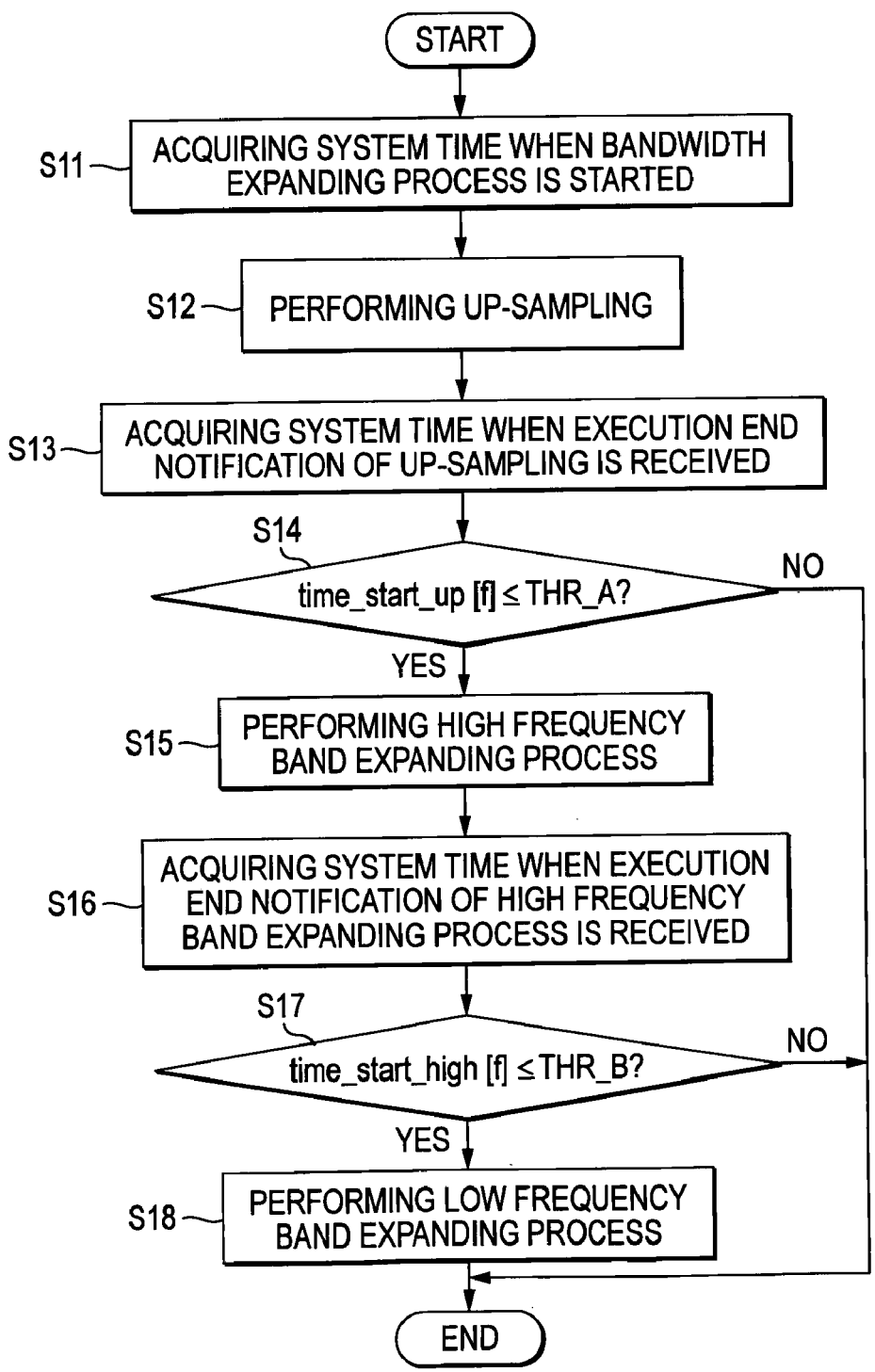
FIG. 4 is an exemplary flowchart illustrating a process of a controller.

FIG. 4 is a flowchart specifically illustrating a process of the controller 32. The controller 32 acquires the system time time[f] (hereinafter, referred to as start time f) at a point of time when the signal bandwidth expansion processor 33 starts the bandwidth expanding process (S11). Subsequently, the up-sampling is performed on the input signal x[n] by the up-sampling unit 331 which notices the module priority representing that the process has the highest priority (S12). When the process of the up-sampling unit 331 is ended, the controller 32 accepts the execution end notification notify_up[f] from the up-sampling unit 331, and once again accepts the system time time[f] (hereinafter, referred to as time_up[f]) at this time (S13). Then, the controller 32 compares the time time_start_up[f]=time_up[f]−time_start[f] taken for the process performed by the up-sampling unit 331 with a predetermined threshold value THR_A (S14).

When the time time_start_up[f] taken for the up-sampling exceeds the threshold value THR_A (No in S14), it can be supposed that another signal bandwidth expanding process is not ended in the predetermined time. Then, the controller 32 sets the control signal control[f] to "0". When the control signal control[f] is "0", the signal bandwidth expansion processor 33 closes the switch 3331, the switch 3333, the switch 3341, and the switch 3343, and does not operate the high frequency band expanding unit 333 and the low frequency band expanding unit 334. Here, THR_A is set to 3 [ms], for example, when a voice frame is 20 [ms].

On the other hand, when time_start_up[f] is equal to or less THR_A (Yes in S14), it can be supposed that the signal bandwidth expanding unit 33 has a margin of time to perform the bandwidth expanding process in the predetermined time in addition to the up-sampling. Here, the controller 32 sets the control signal control[f] to "2" to be noticed by the signal bandwidth expansion processor 33. The case where the control signal control[f] is set to "2" means that the signal bandwidth expansion processor 33 is controlled such that the switch 3331 and the switch 3333 is closed to operate the high frequency band expanding unit 333. That is, the controller 32 controls the high frequency band expanding process to be performed, which has the secondary priority to the up-sampling represented by the module priority (S15). When the process is ended, the high frequency band expanding unit 333 outputs the execution end notification notify_hi[f] to the controller 32. The controller 32 acquires the system time time[f] (hereinafter, referred to as time_hi[f]) once again at a point of time when notify_hi[f] is accepted (S16). Then, the controller 32 compares the time time_start_hi[f]=time_hi[f]−time_start[f] taken for the up-sampling and the high frequency band expansion with a predetermined threshold value THR_B. The threshold value THR_B is set according to the total system load of the up-sampling and the high frequency band expansion in the bandwidth expanding process.

When the time time_start_hi[f] taken for the up-sampling and the high frequency band expansion exceeds the threshold value THR_B (No in S17), it can be assumed that the low frequency band expanding process is performed by the low frequency expanding unit 334. Here, the controller 32 sets the control signal control[f] to "1" to be noticed by the signal bandwidth expansion processor 33. The case where the control signal control[f] is set to "1" means that the signal bandwidth expansion processor 33 is controlled such that the switch 3331 and the switch 3333 are closed so that the signal bandwidth expansion processor 33 is inoperable, and the switch 3341 and the switch 3343 are opened so that the low frequency band expanding unit 334 is inoperable. Here, THR_B is set to 10 [ms].

When the time time_start_hi[f] taken for the up-sampling and the high frequency band expansion is equal to or less than THR_B (Yes in S17), it can be supposed that the low frequency band expanding unit 334 has a margin of time to perform the low frequency band expanding process. Here, the controller 32 set the control signal control[f] to "2" to be noticed to the signal bandwidth expansion processor 33. The signal expansion processor 33, which receives the control signal control[f]=2 in a state of the high frequency band expanding unit 333 under operation, closes the switch 3341 and the switch 3343 and controls the low frequency expanding unit 334 enabling it to operate (S18).

As described above, when the signal bandwidth expanding process is ended within the predetermined time, the expansion process is performed with high accuracy. On the other hand, when the signal bandwidth expanding process is not ended within the predetermined time, the expansion process is simply performed only by the high frequency band expansion or by the up-sampling. For this reason, the process is always ended in the predetermined time, and it is possible to guarantee a safe operation without sound interruption.

Next, the signal bandwidth expansion processor 33 will be described in detail. The signal bandwidth expansion processor 33 expands the bandwidth of the input signal x[n] to obtain a wideband signal y[n] as an output signal. At this time, the process of the bandwidth expansion is changed according to the control signal control[f] which is output from the controller 32.

The high frequency band expanding unit 333 is controlled to operate or not operate according to the control signal control[f] which is output from the controller 32. When the control signal control[f] output from the controller 32 is "1" or "2", the switch 3331 is closed, and the high frequency band expanding unit 333 operates. When the high frequency band expanding unit 333 operates, the high frequency band expanding unit 333 performs a high frequency band expanding process on the input signal x[n] to expand a frequency band higher than the frequency band of the input signal x[n], and thus generates a high frequency wideband signal y_high[n]. Then, the switch 3333 is closed to output the high frequency wideband signal y_high[n]. On the other hand, since the switch 3331 is opened when the control signal control[f] is set to 0, the high frequency band expanding unit 333 does not operate. Then, the switch 3333 is opened not to output the high frequency wideband signal y_high[n].

Figure 5:
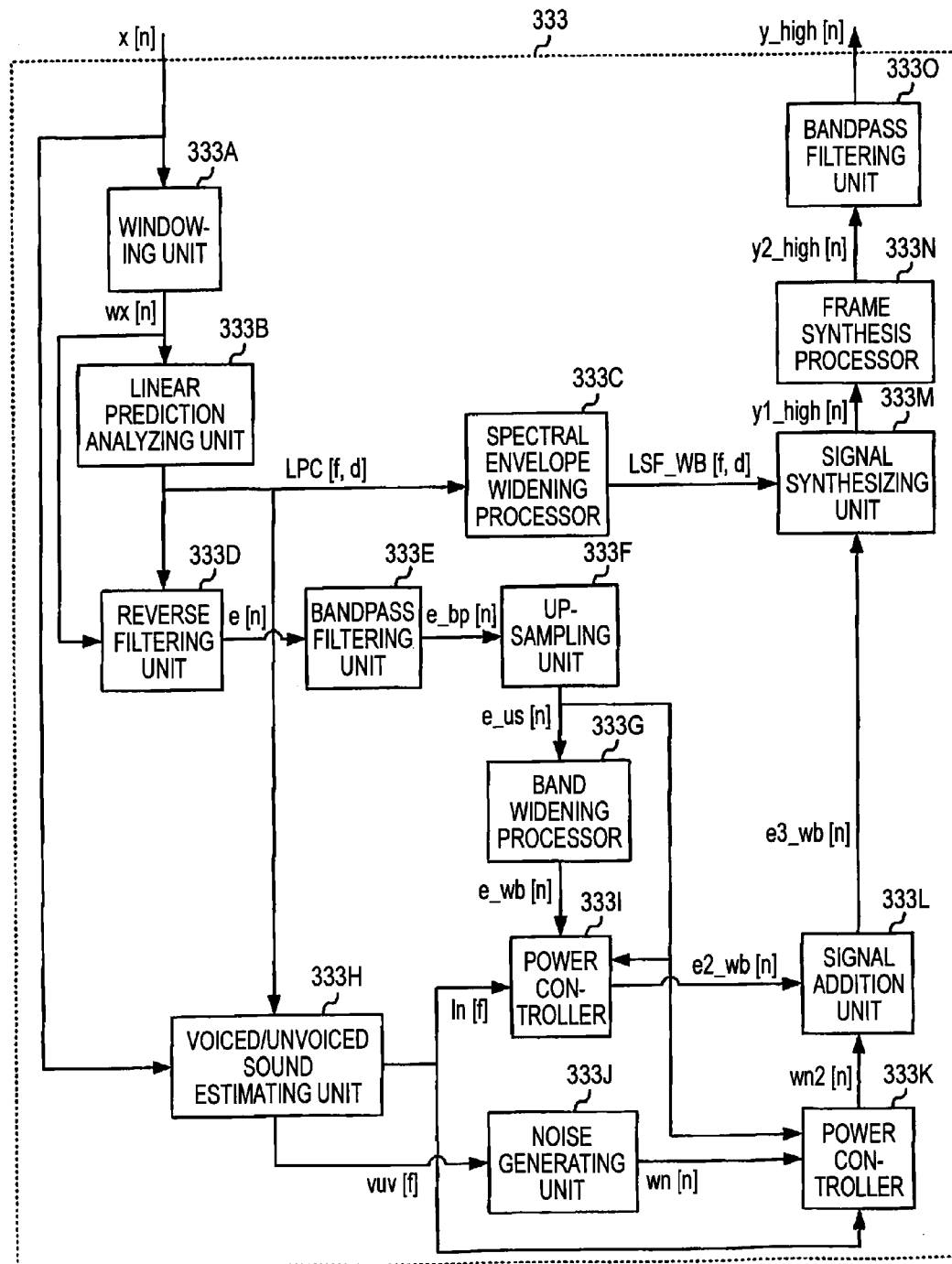
FIG. 5 is a circuit block diagram illustrating an exemplary configuration of a high frequency band expanding unit of a signal bandwidth expanding apparatus.

The high frequency band expanding unit 333 is configured as shown in FIG. 5, for example. The high frequency band expanding unit 333 is provided with a windowing unit 333A, a linear prediction analyzing unit 333B, a spectral envelope widening processor 333C, a reverse filtering unit 333D, a bandpass filtering unit 333E, an up-sampling unit 333F, a band widening processor 333G, a voiced/unvoiced sound estimating unit 333H, a power controller 333I, a noise generating unit 333J, a power controller 333K, a signal addition unit 333L, a signal synthesizing unit 333M, a frame synthesis processor 333N, and a bandpass filtering unit 333O.

The windowing unit 333A receives the input signal x[n] (n=0, 1, ..., N−1) of the current frame f which is limited in a narrowband, and preparing the input signal x[n] (n=0, 1, ..., 2N−1) of 2N in data length by combining two frames in total of the input signals in the current frame and the previous one frame in a time direction, performing the windowing of 2N in data length on the input signal x[n] (n=0, 1, ..., 2N−1) of 2N in data length by multiplying the input signal by a window function which is the hamming window, and outputting the input signal wx[n] (n=0, 1, ..., 2N−1) obtained by the windowing. Further, the input signal in the previous one frame is maintained using a memory provided at the windowing unit 333A. Here, for example, the overlap which is a ratio of a data length (here, which corresponds to 2N samples) of the windowed input signal wx[n] to a shift width (here, which corresponds to N samples) of the input signal x[n] in next time (frame) is 50%. In this case, the window function used in the windowing is not limited to the hamming window, but other symmetric windows (hanning window, blackman window, sine windows, etc.) or asymmetric windows which are used in a voice encoding process may be properly used. In addition, the overlap is not limited to 50%.

The linear prediction analyzing unit 333B receives the input signal wx[n] (n=0, 1, ..., 2N−1) which is subjected to the windowing and output from the windowing unit 333A, performing the Dnb-th linear prediction analysis on the input signal, and obtaining the Dnb-th linear prediction coefficient LPC[f, d] (d=1, ..., Dnb) as a narrowband spectral parameter representing the spectral envelope in a narrowband. Here, Dnb is assumed to be 10, for example. In this embodiment, the case where the linear prediction coefficient is used as the narrowband spectral parameter which represents the narrowband spectral envelope is described as an example. However, as the narrowband spectral parameter, the line spectrum pair (LSP) or the line spectrum frequency (LSF), the PARCOR coefficient, the mel-cepstrum coefficient, or the like may be used.

The spectral envelope widening processor 333C previously prepares the correspondence between the narrowband spectral parameter representing the spectral envelope of the narrowband signal and the wideband spectral parameter representing the spectral envelope of the wideband signal through modelling, and obtains the narrowband spectral parameter (here, which corresponds to the linear prediction coefficient LPC[f, d]). The spectral envelope widening processor 333C uses the spectral parameter to perform a process of obtaining the wideband spectral parameter (here, which corresponds to the line spectral frequency LSF_WB[f, d]) from the correspondence between the narrowband spectral parameter and the wideband spectral parameter which is previously prepared through modelling. As a scheme of the conversion from the spectral parameter representing the narrowband spectral envelope to the spectral parameter representing the wideband spectral envelope, there are a scheme using a code book by the vector quantization (VQ) (for example, Yoshida, Abe, "Generation Method of Voice from Narrowband to Wideband using Code Book Mapping", (D-II), vol. J78-D-II, No. 3, pp. 391-399, March 1995), a scheme using the GMM (for example, K. Y. Park, H. S. Kim, "Narrowband to Wideband Conversion of Speech using GMM based Transformation", Proc. ICASSP2000, vol. 3, pp. 1843-1846, June 2000), a scheme using a code book by the vector quantization and the HMM (for example, G. Chen, V. Parsa, "HMM-based Frequency Bandwidth Extension for Speech Enhancement using Line Spectral Frequencies", Proc. ICASSP2004, vol. 1, pp. 709-712, 2004), and a scheme using the HMM (for example, S. Yao, C. F. Chan, "Block-based Bandwidth Extension of Narrowband Speech Signal by using CDHMM", Proc. ICASSP2005, vol. 1, pp. 793-796, 2005). Any one of the above schemes may be used. Here, the scheme using the Gaussian Mixture Model (GMM) is employed, and the linear prediction coefficient LPC[f, d] which is the narrowband spectral parameter obtained by the linear prediction analyzing unit 333B is converted into the Dwb-th wideband line spectral frequency LSF_WB[f, d] (d=1, ..., Dwb) which is a second wideband spectral parameter corresponding to a range from fs_wb_low [Hz] to fs_wb_high [Hz] using the GMM which is previously prepared through modelling of the correspondence between the linear prediction coefficient LPC[f, d] and the line spectral frequency LSF_WB[f, d]. Here, Dwb is assumed to be 18, for example. The feature quantity data which is the narrowband spectral parameter and represents the spectral envelope is not limited to the linear prediction coefficient, but may be the PARCOR coefficient or the reflection coefficient, the line spectral frequency, the cepstrum coefficient, the mel-cepstrum coefficient, or the like. Similarly, the feature quantity data which is the wideband spectral parameter and represents the spectral envelope is not limited to the line spectral frequency, but may be the linear prediction coefficient LPC, the PARCOR coefficient or the reflection coefficient, the cepstrum coefficient, the mel-cepstrum coefficient, or the like.

The reverse filtering unit 333D forms a reverse filter using the linear prediction coefficient LPC[f, d] output from the linear prediction analyzing unit 333B, inputting the windowed input signal xw[n] of 2N in data length output from the windowing unit 333A to the reverse filter, and outputting the linear prediction residual signal e[n] of 2N in data length which is the narrowband sound source signal.

The bandpass filtering unit 333E is a filter for making the linear prediction residual signal e[n] which is output from the reverse filtering unit 333D pass through the frequency band used in widening the bandpass. In order to remove influence of the low frequency band which is degraded by the bandwidth limitation, the bandpass filtering unit 333E has at least the characteristics of reducing the low frequency band. Here, it is assumed that the bandpass filtering unit makes the input signal pass through a frequency band ranging from 1000 [Hz] to 3400 [Hz]. Specifically, the bandpass filtering unit receives the linear prediction residual signal e[n] of 2N in data length which is obtained by the reverse filtering unit 333D, performing a bandpass filtering, and outputting the linear prediction residual signal e_bp[n] subjected to the bandpass filtering to the up-sampling unit 333F.

The up-sampling unit 333F performs the same process as that of the up-sampling unit 331. The up-sampling unit 333F up-samples the signal e_bp[n], which is output from the bandpass filtering unit 333E, from the sampling frequency fs [Hz] to fs' [Hz], removing the aliasing, and outputting the signal e_us[n] of 4N in data length.

The band widening processor 333G performs a non-linear process on the up-sampled linear prediction residual signal e_us[n] of 4N in data length, which is obtained by the up-sampling unit 333F, and thus converts the linear prediction residual signal into the wideband signal of which the voiced sound having a structure (a harmonic structure) in which the signal has a peak value in frequency domain for every harmonic of the basic frequency. As a result, the widened linear prediction residual signal e_wb[n] of 4N in data length is obtained.

Figure 6A:
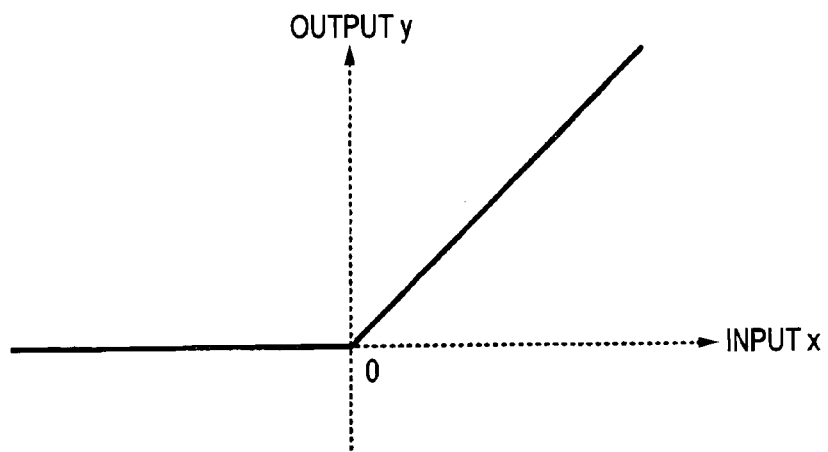
FIGS. 6A and 6B are views illustrating examples of non-linear functions used for a non-linear process of a band widening processor of a high frequency band expanding unit of a signal bandwidth expanding apparatus.
Figure 6B:
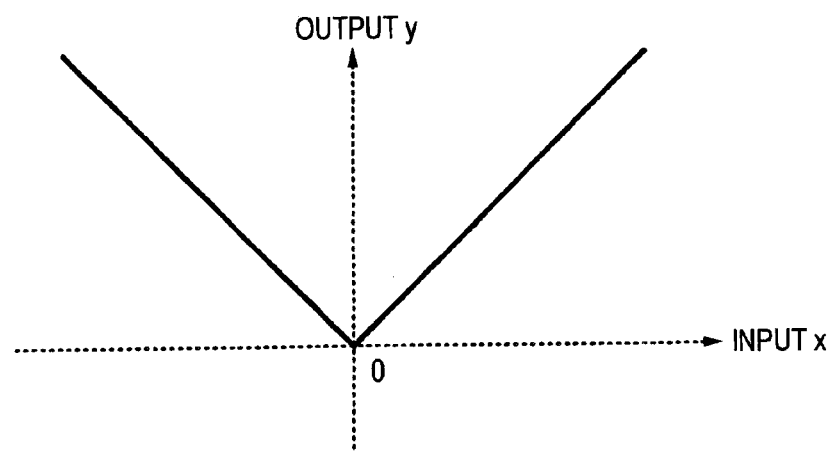

As an example of the non-linear process of conversion to the harmonic structure, there is a non-linear process using a non-linear function as shown in FIGS. 6A and 6B. FIG. 6A shows the half-wave rectification. In addition, the non-linear process of conversion to the harmonic structure may use the full-wave rectification as shown in FIG. 6B. The non-linear process is not limited to these processes. However, it is preferable that the input signal with limited bandwidth be a function with at least periodicity. This is because, when the basic frequency of the input signal is missed in the voiced sound due to the bandwidth limitation, the basic frequency is generated, and when the basic frequency of the input signal is not missed, the basic frequency is not generated.

The voiced/unvoiced sound estimating unit 333H receives the input signal x[n] and the Dn-th linear prediction coefficient LPC[f, d] which is the narrowband spectral parameter subjected to the linear prediction analysis by the linear prediction analyzing unit 333B. Then, the voiced/unvoiced sound estimating unit 333H estimates the input signal x[n] whether to be the "voiced sound" or the "unvoiced sound" in frame units, and outputs estimation information vuv[f]. Specifically, the voiced/unvoiced sound estimating unit 333H first calculates the number of zero crosses from the input signal x[n] in frame units, and divides the calculated value by the frame length N to take an average, and then the averaged value is taken as a negative number to calculate the negative average zero-cross number Zi[f]. Next, as shown in Expression (1), the square sum of the input signal x[n] in frame units is calculated in dB units, and the resulting value is output as the frame power Ci[f].

$$Ci[f] = 10\log_{10}\left(\sum_{n=0}^{N-1} x[n] \cdot x[n]\right) \quad (1)$$

In addition, as shown in Expression (2), the first autocorrelation coefficient In[f] in frame units is calculated.

$$In(f) = \frac{\sum_{n=1}^{N-1} x[n-1] \cdot x[n]}{\sum_{n=0}^{N-1} x[n] \cdot x[n]} \quad (2)$$

Then, zero padding is performed on the Dn-th linear prediction coefficient LPC[f, d] which is the narrowband spectral parameter to generate the signal of which the data length is N, which is a higher power of 2, and the FFT is performed in which the degree is set to N. For example, N is set to 256. In the following descriptions, w represents the number of the frequency bin, which ranges from 1 to N ($1 \leq w \leq N$). As a result of the FFT, the frequency spectrum L[f, w] is obtained, the power spectrum |L[f, w]|² obtained by squaring the frequency spectrum L[f, w] is written as the logarithm using a base of 10, and is increased by −10 times, so that the spectral envelope by the LPC is calculated in dB units. Then, the average value Vi[f] of the spectral envelope by the LPC in the band in which the basic frequency is assumed to exist is calculated as shown in Expression (3). Further, for example, the band in which the basic frequency is assumed to exist is set to 75 [Hz]$\leq$fs·w/256 [Hz]$\leq$325 [Hz], that is, the average of $2 \leq w \leq 11$ is calculated as Vi[f].

$$Vi[f] = \frac{1}{10}\sum_{\omega=2}^{11} -10\log_{10}(|L[f, \omega]|^2) \quad (3)$$

Then, the voiced/unvoiced sound estimating unit 333H monitors the value for every frame. The value is calculated by multiplying the frame power Ci[f] to the linear sum of the negative average zero-cross number Zi[f], the first autocorrelation coefficient In[f], and the average value Vi[f] of the LPC spectral envelope which are weighted with a proper weight values, respectively. When the value exceeds a predetermined threshold value, the voiced/unvoiced sound estimating unit 334I estimates the input signal as the "voiced sound". When the value does not exceed the predetermined threshold value, the voiced/unvoiced sound estimating unit 334I estimates the input signal as the "unvoiced sound". Then, the voiced/unvoiced sound estimating unit 334I outputs the estimation information vuv[f].

The power controller 333I amplifies the widened signal e_wb[n] of 4N in data length, which is obtained by the band widening processor 333G, up to a predetermined level on the basis of the signal e_us[n] of 4N in data length which is output from the up-sampling unit 333F and the first autocorrelation coefficient In[f] which is output from the voiced/unvoiced sound estimating unit 333H. Then, the power controller 333I outputs the amplified signal e2_wb[n] to the signal addition processor 333L. Specifically, the power controller 334I first calculates the square sum of the signal e_us[n] of 4N in data length, calculates the square sum of the signal e_wn[n] of 4N in data length, and calculates the amplification gain g1[f] by dividing the square sum of the signal e_us[n] by the square sum of the signal e_wb[n]. Next, in order to further amplify the level when the input signal is the voiced sound, an amplification gain g2[f] is calculated which approaches a value of 1 when the absolute value of the first autocorrelation coefficient In[f] approaches a value of 1 and approaches a value of 0 when the absolute value of the first autocorrelation coefficient In[f] approaches a value of 0. Then, the power control is performed by multiplying the signal e_wb[n] by the amplification gains g1[f] and g2[f].

When the estimation information vuv[f] as the estimation result of the voiced/unvoiced sound estimating unit 333H corresponds to the "unvoiced sound", the noise generating unit 333J uniformly generates random number to make it as the amplitude value of the signal, and a white noise signal wn[n] of 4N in data length is generated and output.

The power controller 333K amplifies the noise signal wn[n], which is generated by the noise generating unit 333J, up to a predetermined level on the basis of the signal e_us[n] of 4N in data length output from the up-sampling unit 333F and the first autocorrelation coefficient In[f] output from the voiced/unvoiced sound estimating unit 333H. Then, the power controller 333K outputs the amplified signal wn2[n] to the signal addition processor 333L. Specifically, the power controller 333K first calculates the square sum of the signal e_us[n] of 4N in data length, calculating the square sum of the noise signal wn[n] of 4N in data length, and calculating the amplification gain g3[f] by dividing the square sum of the signal e_us[n] by the square sum of the signal wn[n]. Next, in order to further amplify the level when the input signal is the unvoiced sound, an amplification gain g4[f] is calculated which approaches a value of 1 when the absolute value of the first autocorrelation coefficient In[f] approaches a value of 0 and approaches a value of 0 when the absolute value of the first autocorrelation coefficient In[f] approaches a value of 1. Then, the power control is performed by multiplying the noise signal wn[n] by the amplification gains g3[f] and g4[f].

The signal addition processor 333L adds the noise signal wn2[n] output from the power controller 333K and the signal e2_wb[n] output from the power controller 333I, and outputs the signal e3_wb[n] of 4N in data length is output as the wideband sound source signal to the signal synthesizing unit 333M.

The signal synthesizing unit 333M generates the line spectrum pair LSP_WB[f, d] (d=1, . . . , Dwb) on the basis of the line spectral frequency LSF_WB[f, d] (d=1, . . . , Dwb) which is obtained by the spectral envelope widening processor 333C and is the wideband spectral parameter. The signal synthesizing unit 333M that performs an LSP synthesis filter process is on the linear prediction residual signal e3_wb[n] of 4N in data length which is obtained by the signal addition processor 333L and is the wideband sound source signal, and calculates the wideband signal y1_high[n] of 4N in data length.

The frame synthesis processor 333N performs the frame synthesis in order to return the amount of the overlapped portion in the windowing unit 333A, and outputs the wideband signal y1[n] of 2N in data length. Specifically, since the overlap is set to 50% in this case, the y1[n] of 2N in data length is calculated by adding the temporally first half data (which has the data length of 2N) of the wideband signal y1_high[n] of 4N in data length and the temporally second half data (which has the data length of 2N) of the wideband signal y1_high[n] of 4N in data length which is output by the signal synthesizing unit 333M in the previous one frame.

The bandpass filtering unit 333O performs a filtering process, in which only the widen frequency band is passed, on the wideband signal y2_high[n] of 2N in data length which is output from the frame synthesis processor 333N. The bandpass filtering unit 333O outputs the passed signal, that is, the widen frequency band signal as a high frequency wideband signal y_high[n] of 2N in data length. That is, by the filtering process described above, the signal corresponding to the frequency band ranging from fs_nb_high [Hz] to fs_wb_high [Hz] is passed, and the signal in this frequency band is obtained as the high wideband signal y_high[n].

Next, the low frequency band expanding unit 334 will be described. The low frequency band expanding unit 334 is controlled so as to operate or not operate according to the control signal control[f] which is output from the controller 32. When the control signal control[f] is set to 2, the switch 3341 is closed and thus the low frequency band expanding unit 334 operates. When operating, the low frequency band expanding unit 334 performs a low frequency band expanding process on the input signal x[n], and thus generates the low wideband signal y_low[n] which is obtained by expanding the frequency band lower than the frequency band of the input signal x[n]. When the switch 3343 is closed, the low frequency band expanding unit 334 outputs the low wideband signal y_low[n]. On the other hand, when the control signal control[f] is set to 0 or 1, the switch 3341 is opened. Therefore, the low frequency band expanding unit 334 does not operate. The switch 3343 is opened, and thus the low frequency wideband signal y_low[n] is not output.

Figure 7:
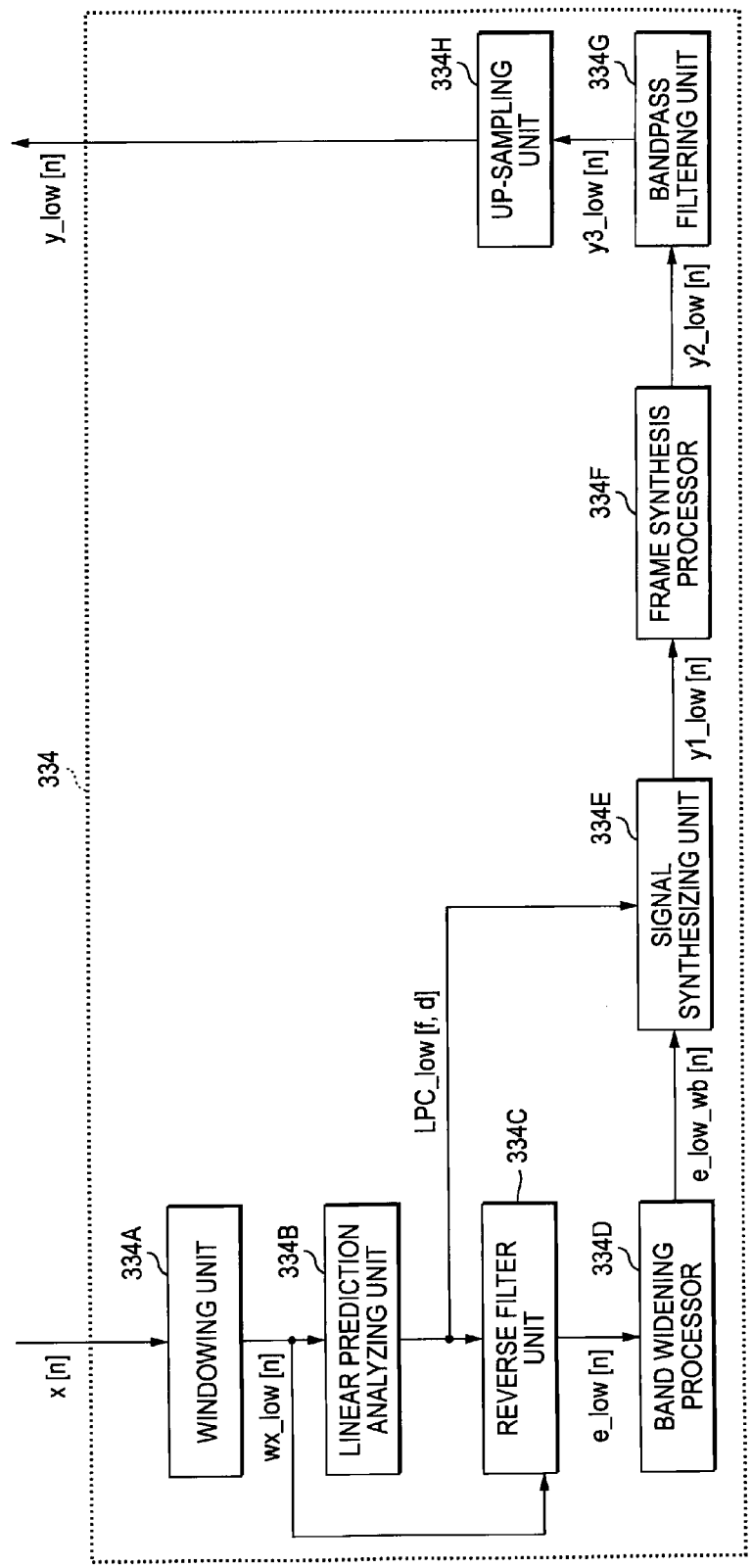
FIG. 7 is a circuit block diagram illustrating an exemplary configuration of a low frequency band expanding unit of a signal bandwidth expanding apparatus.

The low frequency band expanding unit 334 performs the low frequency band expanding process on the input signal x[n] to generate the wideband signal y_low[n] in the low frequency band which is obtained by expanding a frequency band lower than the frequency band of the input signal x[n]. The low frequency band expanding unit 334 is configured as shown in FIG. 7, for example. The low frequency band expanding unit 334 is provided with a windowing unit 334A, a linear prediction analyzing unit 334B, a reverse filter unit 334C, a band widening processor 334D, a signal synthesizing unit 334E, a frame synthesis processor 334F, a bandpass filtering unit 334G and an up-sampling unit 334H.

The windowing unit 334A performs the same process as that of the windowing unit 333A. The windowing unit 334A receives the input signal x[n] (n=0, 1, . . . , N−1) of the current frame f which is limited in a narrowband, and prepares the input signal x[n] (n=0, 1, . . . , 2N−1) of 2N in data length by combining two frames in total of the input signals in the current frame and the previous one frame, performing the windowing of 2N in data length on the input signal x[n] (n=0, 1, . . . , 2N−1) of 2N in data length by multiplying the input signal by a window function, and outputting the input signal wx_low[n] (n=0, 1, . . . , 2N−1) obtained by the windowing. Of course, the windowing unit 334A may be processed in the same way as the windowing unit 333A by setting wx_low[n] to wx[n] (n=0, 1, . . . , 2N−1).

The linear prediction analyzing unit 334B performs the same process as that of the linear prediction analyzing unit 333B. The linear prediction analyzing unit 334B receives the input signal wx_low[n] (n=0, 1, . . . , 2N−1) which is output from the windowing unit 334A and is subjected to the windowing, performs a linear prediction analysis on the input signal, and obtains the Dn-th linear prediction coefficient LPC_low[f, d] (d=1, . . . , Dn) as the second narrowband spectral parameter. Here, Dn is set to 14, for example. Of course, Dn is set to Dnb and LPC_low[f, d] is set to LPC[f, d], and the narrowband spectral parameter is set to be equal to the second narrow spectral parameter, so that the linear prediction analyzing unit 334B may be processed in the same way as the linear prediction analyzing unit 333B.

The reverse filter 334C performs the same process as that of the reverse filter 333D. The reverse filter 334C forms a reverse filter using the linear prediction coefficient LPC_low[f, d] which is obtained by the linear prediction analyzing unit 334B and is the second narrowband spectral parameter, inputting the input signal wx[n] of 2N in data length, which is windowed by the windowing unit 334A, to the reverse filter, and obtaining the linear prediction residual signal e_low[n] of 2N in data length as a second narrowband sound source signal. Of course, Dn is set to Dnb and LPC_low[f, d] is set to LPC[f, d], so that the reverse filter 334C may be processed in the same way as the reverse filter 333D.

The band widening processor 334D performs the same process as that of the band widening processor 333G. The band widening processor 334D performs a non-linear process on the signal e_low[n] of 2N in data length, which is output from the reverse filter 334D, and thus converts the signal into the wideband signal of which the voiced sound has a structure (a harmonic structure) in which the signal has a peak value in frequency domain for every harmonic of the basic frequency. As a result, the widened linear prediction residual signal e_low_wb[n] of 2N in data length is obtained.

The signal synthesizing unit 334E receives the linear prediction coefficient LPC_low[f, d] which is the narrowband spectral parameter and the linear prediction residual signal e_low_wb[n] of 2N in data length. The signal synthesizing unit 334E generates the linear prediction synthesizing filter using the linear prediction coefficient LPC_low[f, d], performs the linear prediction synthesis on the linear prediction residual signal e_low_wb[n] of 2N in data length, and thus generates the wideband signal y1_low[n] of 2N in data length.

The frame synthesis processor 334F performs the same process as that of the frame synthesis processor 333N. The frame synthesis processor 334F performs the frame synthesis in order to return the amount of the overlapped portion in the windowing unit 334A, and calculates the wideband signal y2_low[n] of N in data length. Specifically, since the overlap is set to 50% in this case, the wideband signal y2_low[n] of N in data length is calculated by adding the temporally first half data (which has the data length of N) of the wideband signal y1_low[n] of 2N in data length and the temporally second half data (which has the data length of N) of the wideband signal y1_low[n] of 2N in data length which is output by the signal synthesizing unit 334E in the previous one frame.

The bandpass filtering unit 334G performs a filtering process, in which only the frequency band to be expanded is passed, on the wideband signal y2_low[n] of N in data length which is output from the frame synthesis processor 334F. The bandpass filtering unit 334G outputs the passed signal; that is, the frequency band signal to be expanded as the wideband signal y3_low[n] of N in data length. That is, by the bandpass filtering process described above, the signal corresponding to the frequency band ranging from fs_wb_low [Hz] to fs_nb_low [Hz] is passed, and the signal in this frequency band is obtained as the wideband signal y3_low[n].

The up-sampling unit 334H up-samples the wideband signal y3_low[n] of N in data length, which is output from the bandpass filtering unit 334G, from the sampling frequency fs [Hz] to fs' [Hz], removing the aliasing, and outputting the low frequency wideband signal y_low[n] of 2N in data length.

The up-sampling unit 331 of the signal bandwidth expansion processor 33 up-samples the input signal x[n] of N in data length from the sampling frequency fs [Hz] to fs' [Hz], removing the aliasing, and outputting the resulting signal of 2N in data length.

The signal delay processor 3321 accumulates the up-sampled input signal x_us[n] of 2N in data length, which is output from the up-sampling unit 331, in buffers by a predetermined time (D1 samples) to be delayed and outputs x_us[n−D1]. Therefore, the signal delay processor 331 is synchronized with the signal y_high[n] which is output from the high frequency band expanding unit 333 by matching the timing with each other. That is, the predetermined time (D1 samples) corresponds to the value (D1=D_high−D_us) which is obtained by subtracting the process delay time D_us, which is a time taken from the input to the output in the up-sampling unit 331, from the process delay time D_high which is a time taken from the input to the output in the high frequency band expanding unit 333. The value is calculated in advance, and D1 is used as a fixed value.

The signal delay processor 3322 accumulates the wideband signal y_low[n] of 2N in data length, which is output from the low frequency band expanding unit 334, in buffers by a predetermined time (D2 samples) to be delayed and outputs y_low[n−D2]. Therefore, the signal delay processor 3322 is synchronized with the signal y_high[n] which is output from the high frequency band expanding unit 333 by matching the timing with each other. That is, the predetermined time (D2 samples) corresponds to the value (D2=D_high−D_low) which is obtained by subtracting the process delay time D_low, which is a time taken from the input to the output in the low frequency band expanding unit 334, from the process delay time D_high which is a time taken from the input to the output in the high frequency band expanding unit 333. The value is calculated in advance, and D2 is used as a fixed value. In this case, the signal delay processor 3322 operates only when the control signal control [f] is set to 2 and the low frequency wideband signal y_low[n] is output by the operation of the low frequency band expanding unit 334.

When the control signal control[f] is set to 2, the signal addition unit 332 adds the input signal x_us[n−D1] of 2N in data length, which is output from the signal delay processor 3331, the wideband signal y_low[n−D2] of 2N in data length, which is output from the signal delay processor 3331, and the wideband signal y_high[n] of 2N in data length, which is output from the high frequency band expanding unit 333, in the sampling frequency fs' [Hz], and obtains the wideband signal y[n] of 2N in data length as the output signal. As a result, the up-sampled input signal x_us[n−D1] is expanded to the wideband by the wideband signal y_high[n] and the wideband signal y_low[n]. When the control signal control[f] is set to 1, the signal addition unit 332 adds the input signal x_us[n−D1] of 2N in data length, which is output from the signal delay processor 3331, and the wideband signal y_high [n] of 2N in data length, which is output from the high frequency band expanding unit 333, in the sampling frequency fs' [Hz], and obtains the wideband signal y[n] of 2N in data length as the output signal. As a result, the up-sampled input signal x[n−D1] is expanded to the wideband by the wideband signal y_high[n]. When the control signal control[f] is set to 0, the signal addition unit 332 outputs the input signal x_us [n−D1] of 2N in data length, which is output from the signal delay processor 3331, as the wideband signal y[n] of 2N in data length. That is, in this case, only the up-sampling is performed, but the expansion in bandwidth is not performed.

Figure 8:
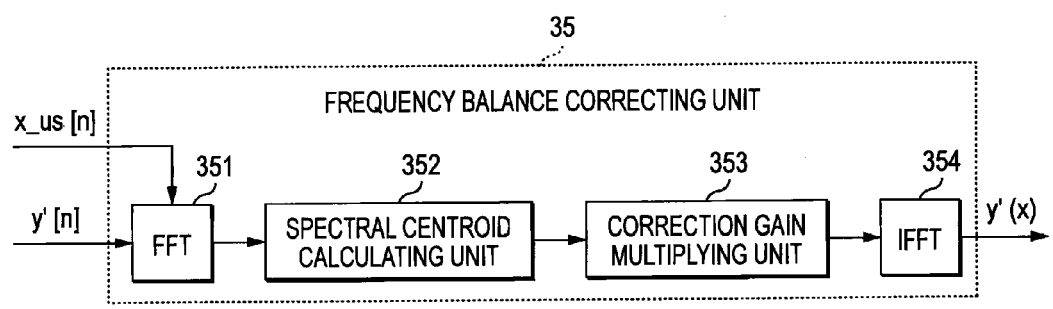
FIG. 8 is an exemplary block diagram illustrating a frequency balance correcting unit.

The frequency balance correcting unit 35 performs power calibration on each frequency band according to the combination of the frequency bands which are generated by the signal bandwidth expansion processor 33. FIG. 8 shows the frequency balance correcting unit 35 in detail. Since the process of the frequency balance correcting unit 35 is changed according to the value of the control signal control[f] (which is 0, 1, or 2), the description will be made by dividing three cases where the control signal control[f] is 0, 1, or 2.

(Control Signal Control[f]=0)

The signal addition unit 332 merely up-samples the input signal, but the output signal thereof is not expanded in the bandwidth. Therefore, an FFT unit 351, a spectral centroid calculating unit 352, a correction gain multiplying unit 353, and an IFFT unit 354 do not perform any process, so that y[n] itself is output as the output signal y'[n].

(Control Signal Control[f]=1)

The signal y[n], which is input from the signal addition unit 332 to the frequency balance correcting unit 35, is a signal which is obtained by expanding the up-sampled input signal x[n−D1] by the wideband signal y_high[n], which will be referred to as y_us_high[n].

In the frequency balance correcting unit 35, the FFT unit 351 receives the up-sampled input signal x_us[n] and the expanded signal y_us_high[n], which are subjected to a frequency modulation process. Further, the frequency modulation process will be explained using 1024-point FFT with which the time/frequency conversion is performed, as an example. Here, the real part and the imaginary part of the spectrum obtained through the 1024-point FFT are assumed as x_us_spec_r[i] and x_us_spec_i[i] (i=0, 1, . . . , 511). In this case, other conversion methods such as MDCT may be employed.

Subsequently, the spectral centroid calculating unit 352 calculates the spectral centroid x_us_centroid of the input signal x_us[n] and the spectral centroid x_us_high_centroid of the widened output signal y_us_high[n]. The spectral centroid x_us_centroid of the input signal x_us[n] is calculated by Expression (4). The spectral centroid x_us_centroid of the widened output signal y_us_high[n] is calculated by Expression (5).

$$x\_us\_centroid = \frac{\sum_{i=0}^{511} \{P\_x\_us[i] * i\}}{\sum_{i=0}^{511} P\_x\_us[i]} \quad (4)$$

$$y\_us\_high\_centroid = \frac{\sum_{i=0}^{511} \{P\_y\_us\_high[i] * i\}}{\sum_{i=0}^{511} P\_y\_us\_high[i]} \quad (5)$$

In this case, P_y_us_high[i] is y_us_high_spec_r[i]$^2$+y_us_high_spec_i[i]$^2$. Further, y_us_high_spec_r is the real part of the FFT spectrum of the widened output signal y_us_high, and y_us_high_spec_i is the imaginary part of the FFT spectrum of the widened output signal y_us_high.

The correction gain multiplying unit 353 performs a correction gain calculation and a multiplying process. First, the correction gain multiplying unit 353 compares x_us_centroid with y_us_high_centroid. Since the expansion process to the high frequency band is performed, the spectral centroid of y_us_high_centroid has a larger value in comparison with that of x_us_centroid; that is, the spectral centroid is changed to the high frequency band. This has the advantage that the high frequency sensitivity is improved, but on the other hand has the disadvantage that, when the value is too large, the low frequency sensitivity is relatively lowered. Here, assuming that the existing threshold value is THR1, when (y_us_high_centroid−x_us_centroid) is larger than THR1, the frequency characteristic of the output signal y_us_high[n] is subjected to the correction by Expression (6).

y_us_high_spec_*r[i]*=f$_1$(y_us_high_centroid−x_us_centroid)×y_us_spec_*r[i]*, (*i*≧252)

y_us_high_spec_*i[i]*=f$_1$(y_us_high_centroid−x_us_centroid)×y_us_spec_*i[i]*, (*i*≧252) (6)

Figure 9:
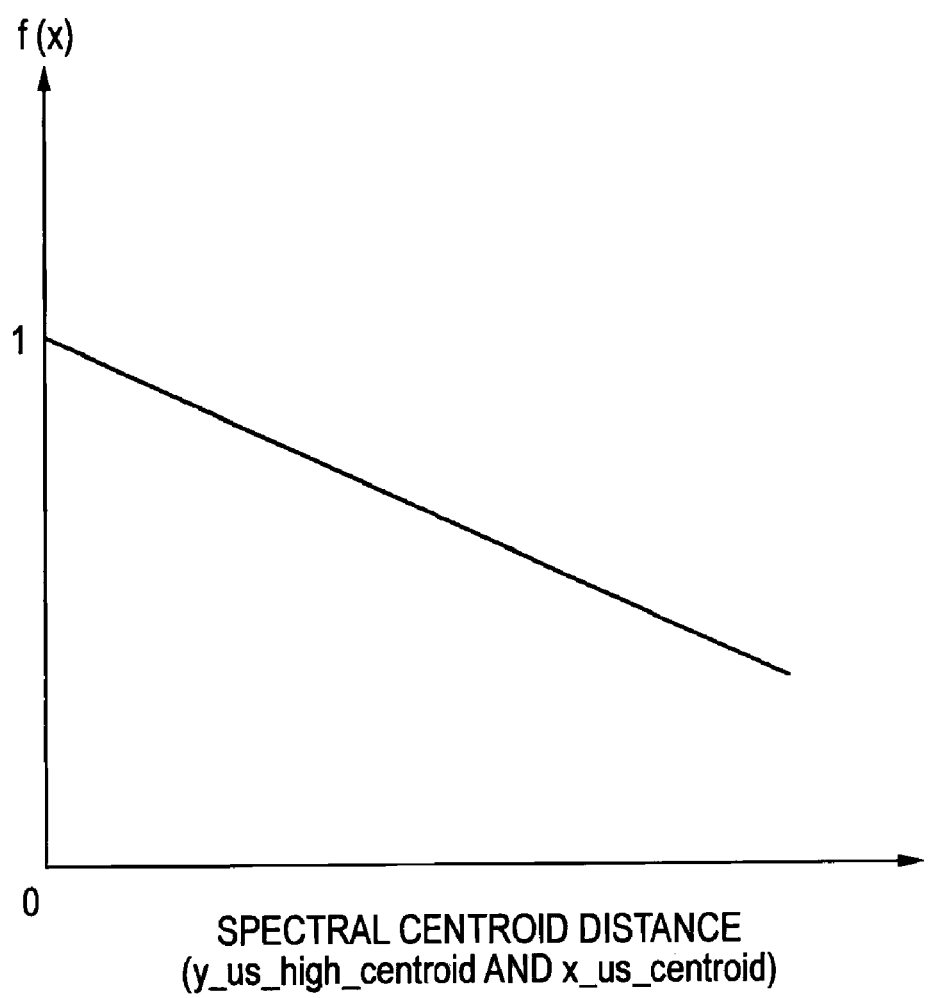
FIG. 9 is an exemplary view illustrating a monotone decreasing function used for frequency characteristic correction.

Here, setting the range of i to 252 or more means that only the component expanded in the high frequency band is corrected. In addition, the f1(*x*) is a function for suppressing the high frequency component in the output signal us_high as the difference increases (centroid difference) between the spectral centroid y_us_high_centroid and x_us_centroid. When the centroid difference is 0, the function f1(*x*) becomes a monotone decreasing function in which the output (which is the gain) becomes 1, for example, the function shown in FIG. 9 is considered. The shape of this function may be set in a range without departing from the point that the gain is to be lowered as the difference of the spectral centroid increases. In addition, the smoothing of the spectrum amplitude value is performed on the boundary between the existing bandwidth and the bandwidth expanded in the high frequency band by the correction by Expression (6), the discontinuity on the boundary is suppressed, and so it is possible to realize a good voice quality.

Finally, the IFFT unit 354 converts the corrected signal into the time domain, and outputs the corrected output signal y'[n].

(Control Signal Control[f]=2)

The signal y[n], which is input from the signal addition unit 332 to the frequency balance correcting unit 35, is a signal which is obtained by expanding the up-sampled input signal x[n−D1] by the wideband signal y_high[n] and the wideband signal y_low[n], which will be referred to as y_us_high_low [n].

When the control signal control[f] is 2, the frequency balance correcting unit 35 first performs frequency conversion on the up-sampled input signal x[n−D1] and the expanded signal y_us_high_low[n] by the FFT unit 351. The process of the frequency conversion is the same as that performed in the case where the control signal control[f] is set to 1, and the description thereof will be omitted.

Next, the spectral centroid calculating unit 352 calculates the spectral centroid x_us_centroid of the input signal x_us [n] and the spectral centroid x_us_high_low_centroid of the widened output signal y_us_high_low[n]. The spectral centroid x_us_centroid of the input signal x_us[n] is calculated by Expression (4). The spectral centroid x_us_high_low_centroid of the widened output signal y_us_high_low[n] is calculated by Expression (7).

$$y\_us\_high\_low\_centroid = \frac{\sum_{i=0}^{511} \{P\_y\_us\_high\_low[i] * i\}}{\sum_{i=0}^{511} P\_y\_us\_high\_low[i]} \quad (7)$$

In this case, P_y_us_high_low[i] is y_us_high_low_spec_r[i]$^2$+y_us_high_low_spec_i[i]$^2$. Further, y_us_high_low_spec_r is the real part of the FFT spectrum of the widened output signal y_us_high_low, and y_us_high_low_spec_i is the imaginary part of the FFT spectrum of the widened output signal y_us_high_low.

Subsequently, the correction gain multiplying unit 353 performs the correction gain calculation and the multiplying process. First, the correction gain multiplying unit 353 compares the difference between x_us_centroid with y_us_high_low_centroid with predetermined threshold values THR2 and THR3. Further, when (y_us_high_low_centroid−x_us_centroid) is larger than THR2, it is determined that the spectral centroid is largely moved to the high frequency band so that the low frequency sensitivity is lowered. Therefore, the frequency characteristic of the output signal y_us_high[n] is subjected to the correction (suppression) by Expression (8).

y_us_high_low_spec_*r[i]*=f$_2$(y_us_high_low_centroid−x_us_centroid)×y_us_spec_*r[i]*, (*i*≧252)

y_us_high_low_spec_*i[i]*=f$_2$(y_us_high_low_centroid−x_us_centroid)×y_us_spec_*i[i]*, (*i*≧252) (8)

Here, setting the range of i to 252 or more means that only the component expanded in the high frequency band is corrected. In addition, the f2(*x*) is a function for suppressing the high frequency component in the output signal us_high_low as the difference increases (centroid difference) between the spectral centroid y_us_high_low_centroid and x_us_centroid. When the centroid difference is 0, the function f2(*x*) becomes the monotone decreasing function in which the output (which is the gain) becomes 1, for example, the function shown in FIG. 9 is considered. The shape of this function may be set in a range without departing from the point that the gain is to be lowered as the difference of the spectral centroid increases. In addition, the smoothing of the spectrum amplitude value is performed on the boundary between the existing bandwidth and the bandwidth expanded in the high frequency band by the correction by Expression (8), the discontinuity on the boundary is suppressed, and it is possible to realize a good voice quality. On the other hand, when (x_us_centroid−y_us_high_low_centroid) is larger than THR3, it is determined that the spectral centroid is largely moved to the low frequency band so that the high frequency sensitivity is lowered. Therefore, the lower frequency component of the frequency characteristic of the output signal y_us_high[n] is subjected to the correction (suppression) by Expression (9).

$$y\_us\_high\_low\_spec\_r[i] = f_3(x\_us\_centroid - y\_us\_high\_low\_centroid) \times y\_us\_spec\_r[i],$$
$$(0 \leq i < 22)$$

$$y\_us\_high\_low\_spec\_i[i] = f_3(x\_us\_centroid - y\_us\_high\_low\_centroid) \times y\_us\_spec\_i[i],$$
$$(0 \leq i < 22) \quad (9)$$

Here, setting the range of i to 0 or more and less than 22 means that only the component expanded in the low frequency band is corrected. In addition, the f3(x) is a function for suppressing the low frequency component in the output signal us_high_low as the increased difference between the spectral centroid y_us_high_low_centroid and x_us_centroid. When the centroid difference is 0, the function f3(x) becomes the monotone decreasing function in which the output (which is the gain) comes to be 1, for example, the function shown in FIG. 9 is considered. The shape of this function may be set in a range without departing from the point that the gain is to be lowered as the difference of the spectral centroid increases. In addition, the smoothing of the spectrum amplitude value is performed on the boundary between the existing bandwidth and the bandwidth expanded in the low frequency band by the correction by Expression (9), the discontinuity on the boundary is suppressed, and it is possible to realize a good voice quality.

Finally, the IFFT unit 354 converts the corrected signal into the time domain, and outputs the corrected output signal y'[n].

As described above, in a case where the bandwidth expanding unit 3 is applied to the signal bandwidth expanding apparatus, even when the scalable bandwidth expanding process is performed according to the system load, the bandwidth sensitivity of the existing bandwidth component is prevented from being relatively lowered in consideration of the frequency balance between the expanded bandwidth and the existing bandwidth. Therefore, it is possible to reproduce the voice with good quality which always maintains the proper frequency balance.

Further, in this embodiment, only the input signal x[n] is configured to be input from the decoder 2 to the bandwidth expanding unit 3. However, information obtained by the decoder 2 or processed information thereof (for example, the linear prediction coefficient LPC[f, d], the linear prediction residual signal e[n], etc.) may be used in the bandwidth expanding unit 3.

As a result, the modules for calculating the respective signals are not necessary, and it is possible to reduce the computational load.

Further, the invention is not limited to the embodiment described above, but various changes can be made without departing from the scope of the invention.

Figure 10:
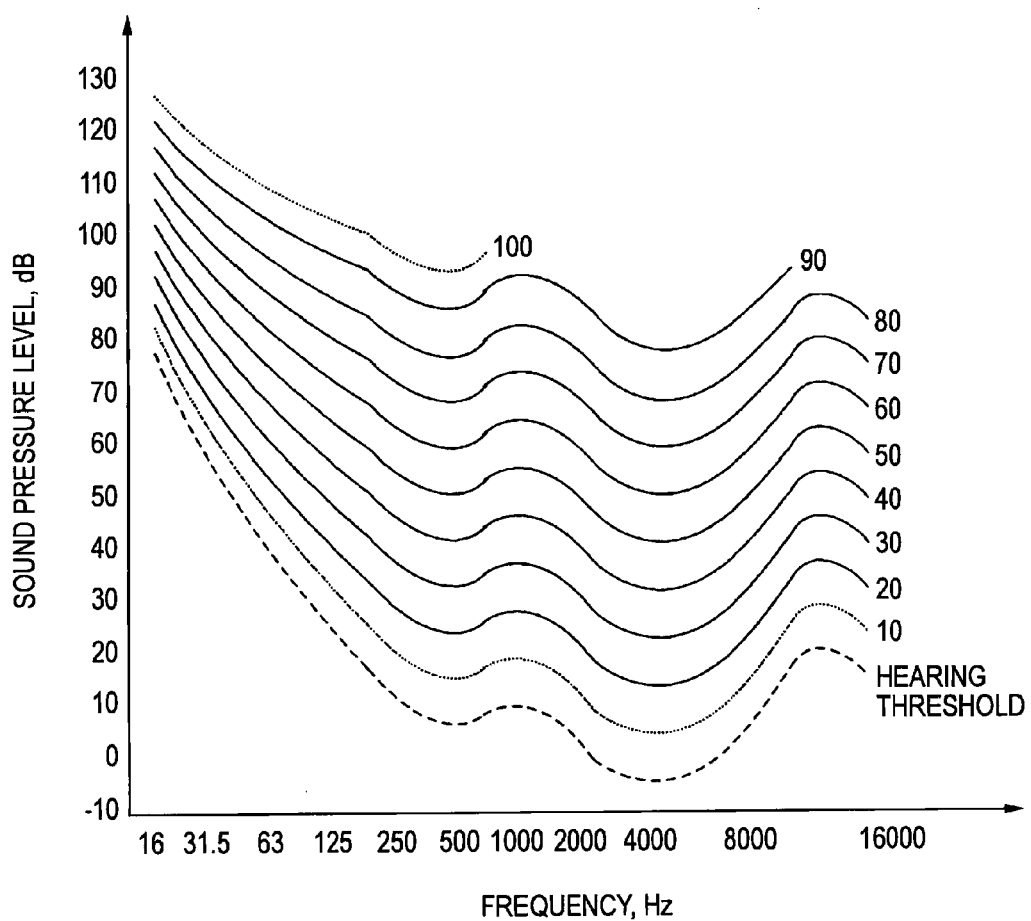
FIG. 10 is an exemplary view illustrating a loudness characteristic.

For example, in the above-mentioned embodiment, the module priority which is held by the module the module priority holding unit 34 is determined based on the frequency resolution of the hearing sense of human ears. Therefore, in the above description, the priority is set using the scale (for example, the bark scale) with which the frequency resolution of the hearing sense of human ears becomes constant. By taking into consideration of a loudness characteristic in each bandwidth shown in FIG. 10, it is possible to determine the priority which is more suitable for the hearing sense, which will be described in the following example.

First, the bark scale width bark_low of the low frequency band expanding portion (50 to 340 [Hz]) and the bark scale width bark_high of the high frequency band expanding portion (3950 to 7950 [Hz]) are calculated using the conversion expression into the bark scale. The statistical frequency power distribution of the voice data is calculated. In calculation of the statistical frequency power distribution, it is considered to take an average of many pieces of data, which includes a voice database or recorded voices. The time/frequency conversion is explained using the 1024-point FFT conversion as an example, but other conversion method such as the MDCT may be employed. The frequency spectrum subjected to the FFT conversion is divided into the real part spec_r[i] and the imaginary part spec_i[i] (here, i=0, 1, . . . , 1023). The power spec_pow[i] of each frequency bin is obtained by spec_pow[i]=spec_r[i]*spec_r[i]+spec_i[i]*spec_i[i]. Subsequently, the frequency power is converted into the loudness. Here, the conversion function from the frequency spectrum power to the loudness is denoted by L(x) (here, x is the power of each frequency bin) for convenience of explanation. As described above, the loudness loudness[i]= L(spec_pow[i]) is calculated for every frequency bin. Subsequently, an average loudness is calculated for every bandwidth which is expanded by the signal bandwidth expansion. The average loudness of the low frequency band expanding portion is expressed by Expression (10), and the average loudness of the high frequency band expanding portion is expressed by Expression (11).

$$\text{ave\_loudness\_low} = \frac{1}{18} \cdot \sum_{i=2}^{20} \text{loudness}[i] \quad (10)$$

$$\text{ave\_loudness\_high} = \frac{1}{127} \cdot \sum_{i=251}^{1} \text{loudness}[i] \quad (11)$$

Here, the addition section index i=2, . . . , 20 of Σ function in the low frequency band expanding portion and the additional section index i=251, . . . , 507 of Σ function in the high frequency band expanding portion correspond to both ends of the low frequency band expanding portion (50 to 340 [Hz]) and the high frequency band expanding portion (3950 to 7950 [Hz]). When the loudness of each expanding portion obtained as described above is multiplied as the weight by the bark scale widths bark_low and bark_high, bark_low' becomes w(ave_loudness_low)*bark_low and bark_high' becomes w(ave_loudness_high)*bark_high. Here, w( ) is the monotone increasing function which receives the loudness value as an input and calculates the weight. The bandwidth of which the value is larger among bark_low' and bark_high' calculated as described above is determined to have the higher importance on the hearing sense so as to set the priority to be high. As described above, even when the system load is large, it is possible to perform the voice band process with high quality which can firstly generate the important band in the hearing sense. Further, in the above description, the expansion process is exemplified in two ways of the low frequency band expansion and the high frequency band expansion. However, even when the expansion process is performed by finely dividing the band into 3 or more bands, the same method can be employed.

Figure 11:
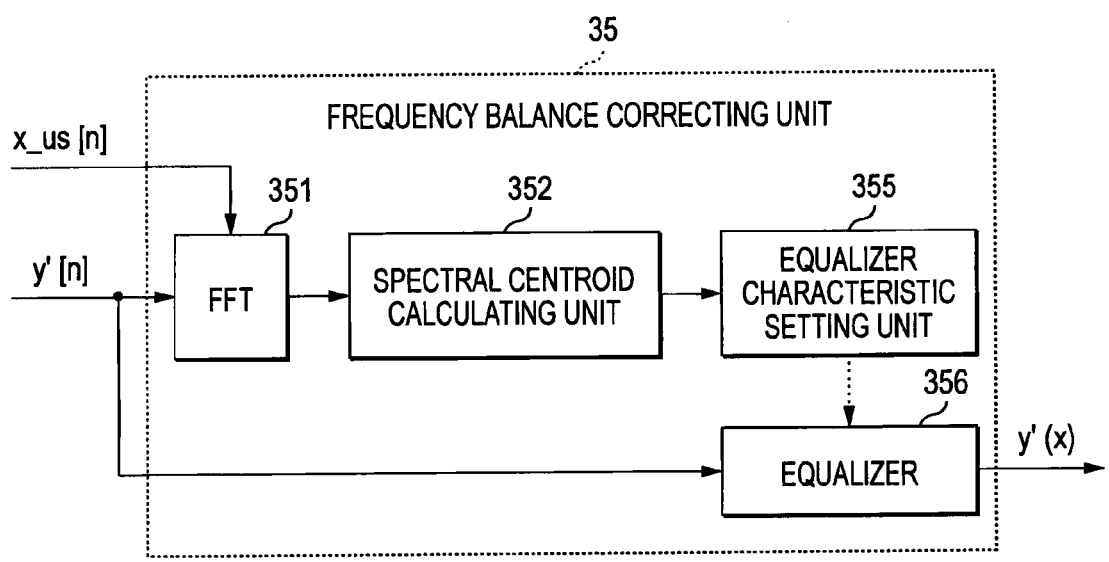
FIG. 11 is a block diagram illustrating another example of the frequency balance correcting unit.

In addition, also in the frequency balance correcting unit 35, a modified example can be considered. FIG. 11 is a block diagram illustrating a configuration of the frequency balance correcting unit 35 using an equalizer. Since the processes performed by the FFT 351 and the spectral centroid calculating unit 352 are the same as that shown in FIG. 8 described above, and the description thereof will be omitted. Further, the spectral centroid obtained by calculating the signal x_us

[n] which is obtained by up-sampling the input signal x[n] is assumed as x_us_centroid, and the spectral centroid obtained by calculating the widened signal y[n] is assumed as y_centroid. An equalizer characteristic setting unit 355 compares the difference between x_us_centroid and y_centroid with predetermined threshold values THR4 and THR5.

Figure 12:
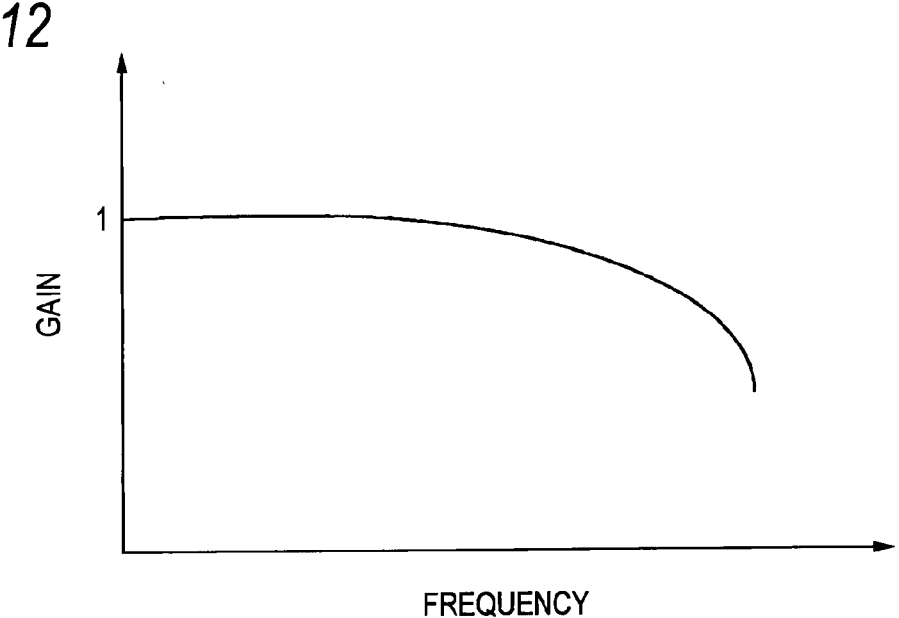
FIG. 12 is a view illustrating an example (high frequency suppression) of an equalizer characteristic.
Figure 13:
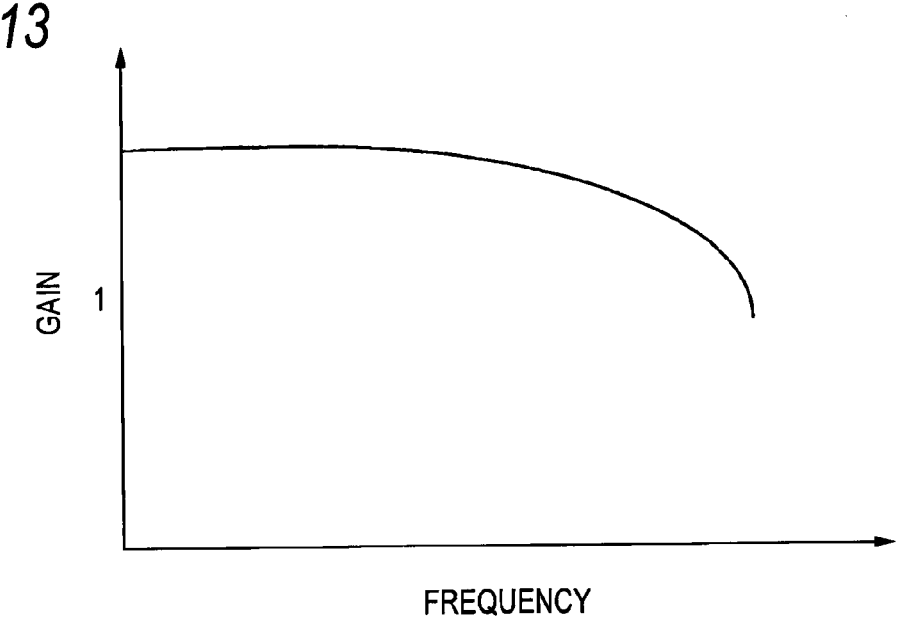
FIG. 13 is a view illustrating an example (high frequency suppression) of an equalizer characteristic.

When (y_centroid−x_us_centroid)>THR4, it is determined that the spectral centroid is largely moved to the high frequency band by the bandwidth expanding process. Therefore, the equalizer characteristic to suppress the high frequency component is the characteristic shown in FIG. 12, for example. In this case, in FIG. 12, the maximum gain of the equalizer is set to 1, but on contrary the characteristic shown in FIG. 13 may be set such that a middle low frequency band of the equalizer is amplified. Any characteristic may be set without departing the point that the bandwidth higher than the middle low frequency band is to be suppressed.

Figure 14:
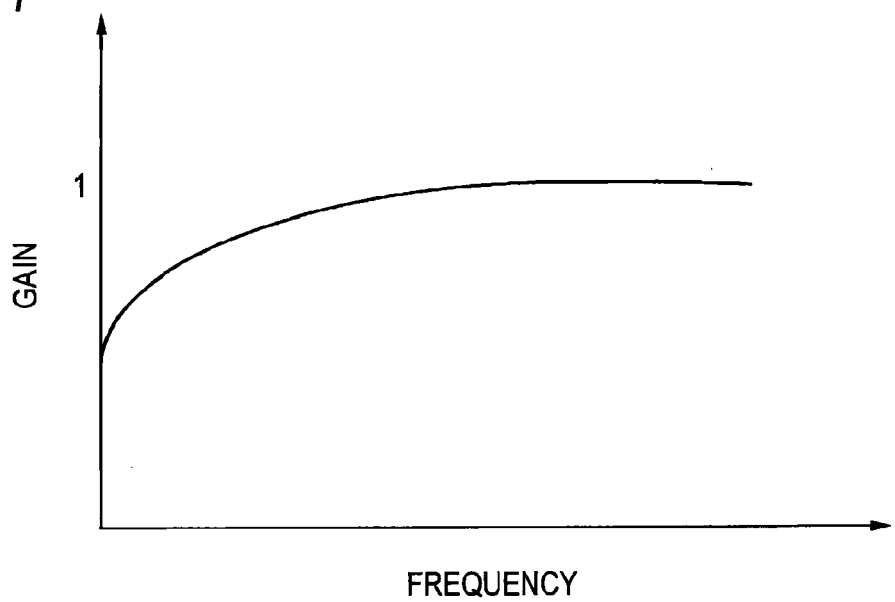
FIG. 14 is a view illustrating an example (low frequency suppression) of an equalizer characteristic.
Figure 15:
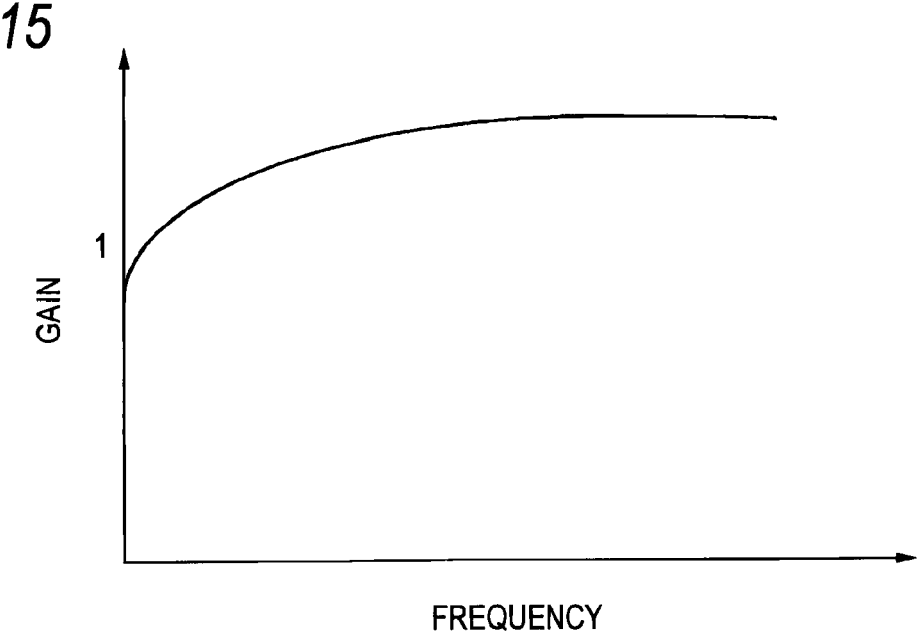
FIG. 15 is a view illustrating an example (low frequency suppression) of an equalizer characteristic.

On the other hand, when (x_us_centroid−y_centroid)>THR5, it is determined that the spectral centroid is largely moved to the low frequency band by the bandwidth expanding process. Therefore, the equalizer characteristic is set to suppress the low frequency band. For example, as shown in FIG. 14, the equalizer is set to have the characteristic in which the gain of the low frequency band is suppressed. In FIG. 14, the maximum gain of the equalizer is described as 1, but on contrary the characteristic shown in FIG. 15 may be set such that the middle low frequency band of the equalizer is amplified. In addition, any characteristic may be set without departing the point that the bandwidth higher than the middle low frequency band is to be suppressed.

As described above, in a case where the bandwidth expanding unit 3 is applied to the signal bandwidth expanding apparatus, even when the scalable bandwidth expanding process is performed according to the system load, the bandwidth sensitivity of the existing bandwidth component is prevented from being relatively lowered in consideration of the frequency balance between the expanded bandwidth and the existing bandwidth. Therefore, it is possible to reproduce the voice with good quality which always maintains the proper frequency balance.

What is claimed is:

1. A signal bandwidth expanding apparatus configured to expand a bandwidth of an input signal, the apparatus comprising:
    a time acquiring module configured to acquire time information;
    a priority holding module configured to hold priority information of respective processes for each bandwidth to be expanded, the processes comprised in a process of bandwidth expansion;
    a controller configured to: sequentially perform the processes in descending order of priority using the priority information held by the priority holding module, calculate a time taken for the process using the time acquiring module when the process is ended, and control whether or not a next process having a secondary priority is performed according to the time taken for the process; and
    a frequency balance correcting module configured to control a power balance between an existing bandwidth and an expanded bandwidth that is expanded in accordance with a difference between a spectral centroid of a signal expanded by the process performed by the controller and a spectral centroid of a signal before a bandwidth is expanded,
    wherein the frequency balance correcting module is configured to perform the control so as to suppress a power of the expanded bandwidth when the spectral centroid of the signal is moved toward the expanded bandwidth by an amount equal to or larger than a predetermined threshold value by the process performed by the controller.

2. The apparatus of claim 1, wherein the priority information held by the priority holding module is set based on importance on hearing sense in each bandwidth to be expanded.

3. A signal bandwidth expanding apparatus configured to expand a bandwidth of an input signal, the apparatus comprising:
    a time acquiring module configured to acquire time information;
    a priority holding module configured to hold priority information of respective processes for each bandwidth to be expanded, the processes comprised in a process of bandwidth expansion;
    a controller configured to: sequentially perform the processes in descending order of priority using the priority information held by the priority holding module, calculate a time taken for the process using the time acquiring module when the process is ended, and control whether or not a next process having a secondary priority is performed according to the time taken for the process; and
    a frequency balance correcting module configured to control a power balance between an existing bandwidth and an expanded bandwidth that is expanded in accordance with a difference between a spectral centroid of a signal expanded by the process performed by the controller and a spectral centroid of a signal before a bandwidth is expanded,
    wherein the frequency balance correcting module is configured to perform the control so as to amplify a power of the existing bandwidth when the spectral centroid of the signal is moved toward the expanded bandwidth by an amount equal to or larger than a predetermined threshold value by the process performed by the controller.

4. The apparatus of claim 3, wherein the priority information held by the priority holding module is set based on importance on hearing sense in each bandwidth to be expanded.

* * * * *